United States Patent
Carrillo et al.

(10) Patent No.: US 11,725,758 B2
(45) Date of Patent: Aug. 15, 2023

(54) FLUID LINE QUICK CONNECTOR WITH SPACER HAVING ANGLED SURFACE(S)

(71) Applicant: Norma U.S. Holding LLC, Auburn Hills, MI (US)

(72) Inventors: Jorge Alberto Marquez Carrillo, Nuevo Leon (MX); Juan Antonio Garcia Lopez, Nuevo Leon (MX)

(73) Assignee: Norma U.S. Holding LLC, Auburn Hills, MI (US)

( * ) Notice: Subject to any disclaimer, the term of this patent is extended or adjusted under 35 U.S.C. 154(b) by 57 days.

(21) Appl. No.: 16/916,542

(22) Filed: Jun. 30, 2020

(65) Prior Publication Data
US 2021/0404582 A1 Dec. 30, 2021

(51) Int. Cl.
*F16L 21/03* (2006.01)
*F16L 23/18* (2006.01)
*F16L 29/02* (2006.01)

(52) U.S. Cl.
CPC .............. *F16L 21/03* (2013.01); *F16L 23/18* (2013.01); *F16L 29/02* (2013.01); *F16L 2201/20* (2013.01)

(58) Field of Classification Search
CPC ........ F16L 23/18; F16L 29/02; F16L 2201/20
See application file for complete search history.

(56) References Cited

U.S. PATENT DOCUMENTS

| | | | | |
|---|---|---|---|---|
| 1,826,967 A * | 10/1931 | Claud | ...................... | F16J 15/20 277/516 |
| 2,699,344 A * | 1/1955 | Bissell | ...................... | F16L 23/18 285/341 |
| 2,879,094 A * | 3/1959 | Transeau | .............. | F16K 5/0464 277/532 |
| 5,154,451 A * | 10/1992 | Washizu | ............. | F16L 37/0987 285/921 |
| 5,528,972 A * | 6/1996 | Wilson | .................. | F16J 15/0887 89/7 |
| 5,542,716 A * | 8/1996 | Szabo | ................... | F16L 37/144 285/305 |
| 6,536,807 B1 * | 3/2003 | Raymond | ............ | F02M 69/462 285/308 |

(Continued)

FOREIGN PATENT DOCUMENTS

| | | |
|---|---|---|
| EP | 0410842 B1 | 12/1992 |
| JP | 2003254484 A | 9/2003 |
| WO | WO2005086823 A2 | 9/2005 |

OTHER PUBLICATIONS

International Search Report and Written Opinion for PCT/US2021/039757 dated Oct. 22, 2021 (7 pages).

(Continued)

*Primary Examiner* — Zachary T Dragicevich
*Assistant Examiner* — James A Linford
(74) *Attorney, Agent, or Firm* — Reising Ethington, P.C.

(57) ABSTRACT

A connector seal pack spacer and assembly are employed for use in a fluid line quick connector in an automotive application, for instance. The spacer is located beside an o-ring in installation in the fluid line quick connector. The spacer is designed and constructed with an angled surface that, upon insertion of a spigot in the fluid line quick connector, works to maintain an intended position of the o-ring in the fluid line quick connector. Unwanted mispositioning and dislodging of the o-ring is hence minimized and, in some cases, altogether precluded.

8 Claims, 4 Drawing Sheets

(56) References Cited

U.S. PATENT DOCUMENTS

| | | |
|---|---|---|
| 6,722,703 B2 | 4/2004 | Takayanagi |
| 2003/0184088 A1 | 10/2003 | Takayanagi et al. |
| 2005/0093298 A1 | 5/2005 | Takayanagi |

OTHER PUBLICATIONS

International Preliminary Report on Patentability for PCT/US2021/039757 dated Dec. 13, 2022 (5 pages).

* cited by examiner

FLUID LINE QUICK CONNECTOR WITH SPACER HAVING ANGLED SURFACE(S)

TECHNICAL FIELD

This disclosure relates generally to quick connectors used to join fluid lines together and, more particularly, to connector seal pack assemblies and spacers employed in quick connectors.

BACKGROUND

Connectors, especially those with quick-connect functionality, are commonly used to join fluid lines together in vehicle applications. One example is coolant fluid lines in electric vehicle automobiles. Still, other examples exist in automotive applications, as well as in non-automotive applications. Seal pack assemblies with spacers and o-rings are oftentimes placed somewhere in the interiors of quick connectors. The seal pack assemblies serve to prevent the escape of fluid at an established joint between a quick connector and a spigot that is inserted in the quick connector. It is important to keep the o-rings in their intended positions in order to ensure proper insertion of spigots and effective sealing amid subsequent use.

SUMMARY

In an embodiment, a connector seal pack assembly may include one or more o-rings and a spacer. The spacer can be located beside the o-ring(s) in assembly and installation. The spacer has a radially-inboard surface, a first axially-outboard surface, a second axially-outboard surface, and an angled surface. The first axially-outboard surface spans from the radially-inboard surface, and the second axially-outboard surface spans from the radially-inboard surface. The angled surface spans from the first axially-outboard surface or from the second axially-outboard surface. In sectional profile, the angled surface depends from the first axially-outboard surface or from the second axially-outboard surface at an acute angle with respect to an axial centerline of the spacer. The acute angle is a non-zero angle relative to the axial centerline of the spacer, and the acute angle is a non-right angle relative to the axial centerline of the spacer.

In an embodiment, a connector seal pack spacer may include a radially-inboard surface, a first axially-outboard surface, a second axially-outboard surface, a first angled surface, a second angled surface, and a radially-outboard surface. The first axially-outboard surface spans from the radially-inboard surface. The second axially-outboard surface spans from the radially-inboard surface. The first angled surface spans from the first axially-outboard surface, and the second angled surface spans from the second axially-outboard surface. Lastly, the radially-outboard surface spans between the first angled surface and the second angled surface.

In an embodiment, a fluid line quick connector may include a housing, one or more o-rings, and a spacer. The housing has a passage and a wall. The wall has an inside surface that defines the passage. The o-ring(s) is located within the passage. The spacer is located within the passage and near the o-ring(s). The spacer has a first angled surface that makes a first acute angle. The first acute angle is with respect to an axial centerline of the spacer. The spacer has a second angled surface that makes a second acute angle. The second acute angle is with respect to the axial centerline of the spacer. The spacer has a radially-outboard surface that spans between the first angled surface and the second angled surface. The spacer has a first end edge that adjoins the first angled surface and the radially-outboard surface, and has a second end edge that adjoins the second angled surface and the radially-outboard surface. The first and second acute angles are non-zero angles relative to the axial centerline of the spacer, and the first and second acute angles are non-right angles relative to the spacer's axial centerline. Upon insertion of a spigot within the fluid line quick connector and into the passage, the first end edge makes contact with the inside surface and the second end edge makes contact with the inside surface. The spacer urges the o-ring(s) toward the inside surface.

BRIEF DESCRIPTION OF THE DRAWINGS

Embodiments of the disclosure are described with reference to the appended drawings, in which.

DETAILED DESCRIPTION

With reference to the figures, an embodiment of a spacer 10 is presented for use with a fluid line quick connector (hereafter, quick connector) 12. Unlike previously-known spacer parts, the spacer 10 is designed and constructed with one or more angled surfaces at its outer region. The angled surface(s) works to alter the behavior of the spacer 10 upon insertion of a spigot in the quick connector 12, in particular relocating a contact point between the spacer 10 and a neighboring o-ring, and changing the direction of a force component therebetween. The o-ring is urged outward and toward an inside surface of the quick connector 12. The intended position of the o-ring inside of the quick connector 12 is hence maintained when the spigot is in the midst of being inserted, and even when the spigot and quick connector 12 are misaligned at the time of insertion. Unwanted mispositioning and dislodging of the o-ring is minimized and, in some instances, altogether precluded. This description presents the spacer 10 and quick connector 12 in the context of automotive fluid lines, such as coolant fluid lines in electric vehicle automobiles, but the spacer 10 and quick connector 12 have broader application and are suitable for use in aircraft fluid lines, marine fluid lines, agricultural fluid lines, as well as other fluid lines. Furthermore, unless otherwise specified, the terms radially, axially, and circumferentially, and their grammatical variations refer to directions with respect to the generally circular shape of the spacer 10 as illustrated in the figures.

Figures 1, 2, 4:
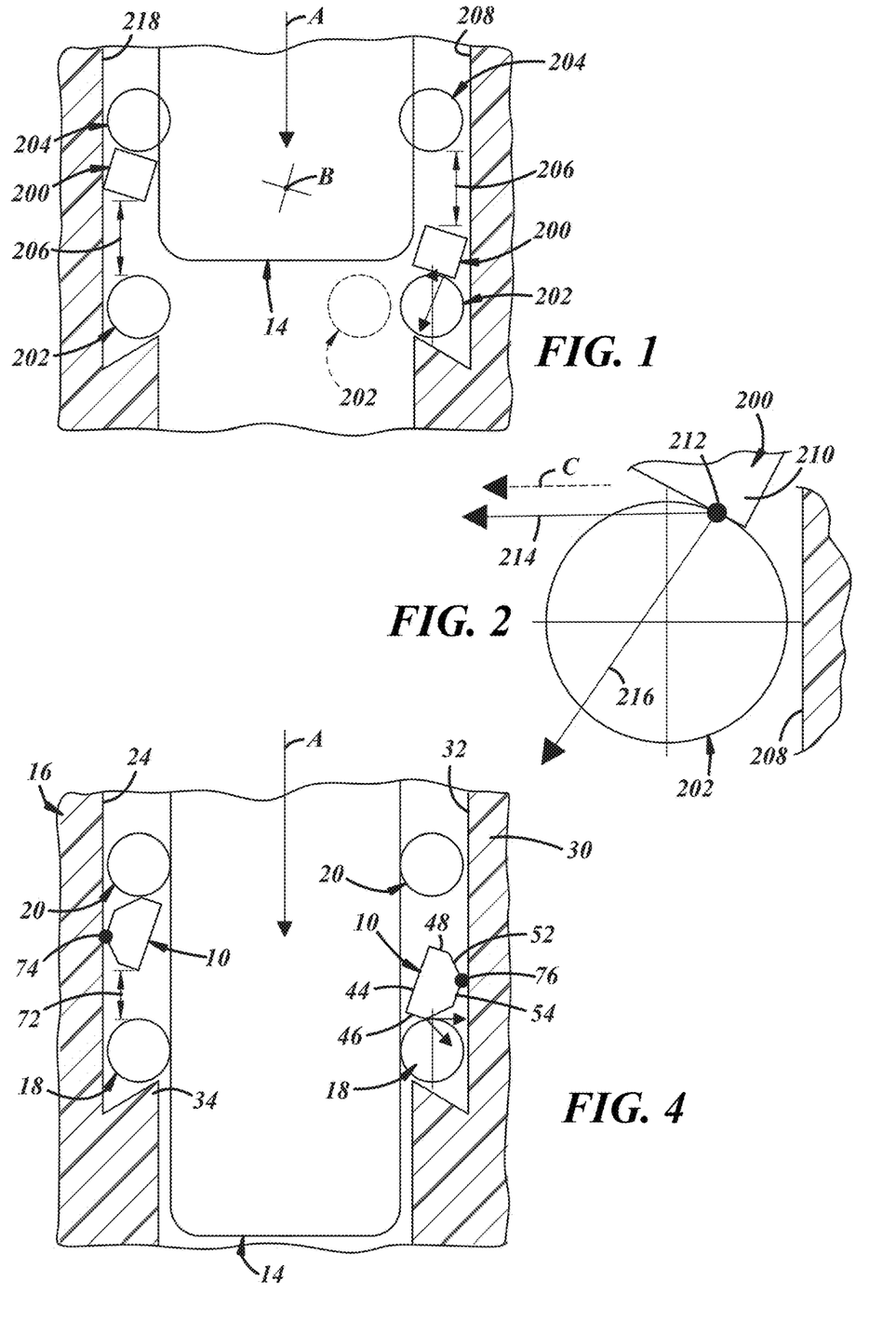
FIG. 1 is fragmented sectional view of a previously-known seal pack.
FIG. 2 depicts an o-ring of the previously-known seal pack, and shows a representation of a contact point and force component thereof.
FIG. 4 is a fragmented sectional view of embodiments of a spacer and o-rings that can be used with the fluid line quick connector of FIG. 3.
Figure 3:
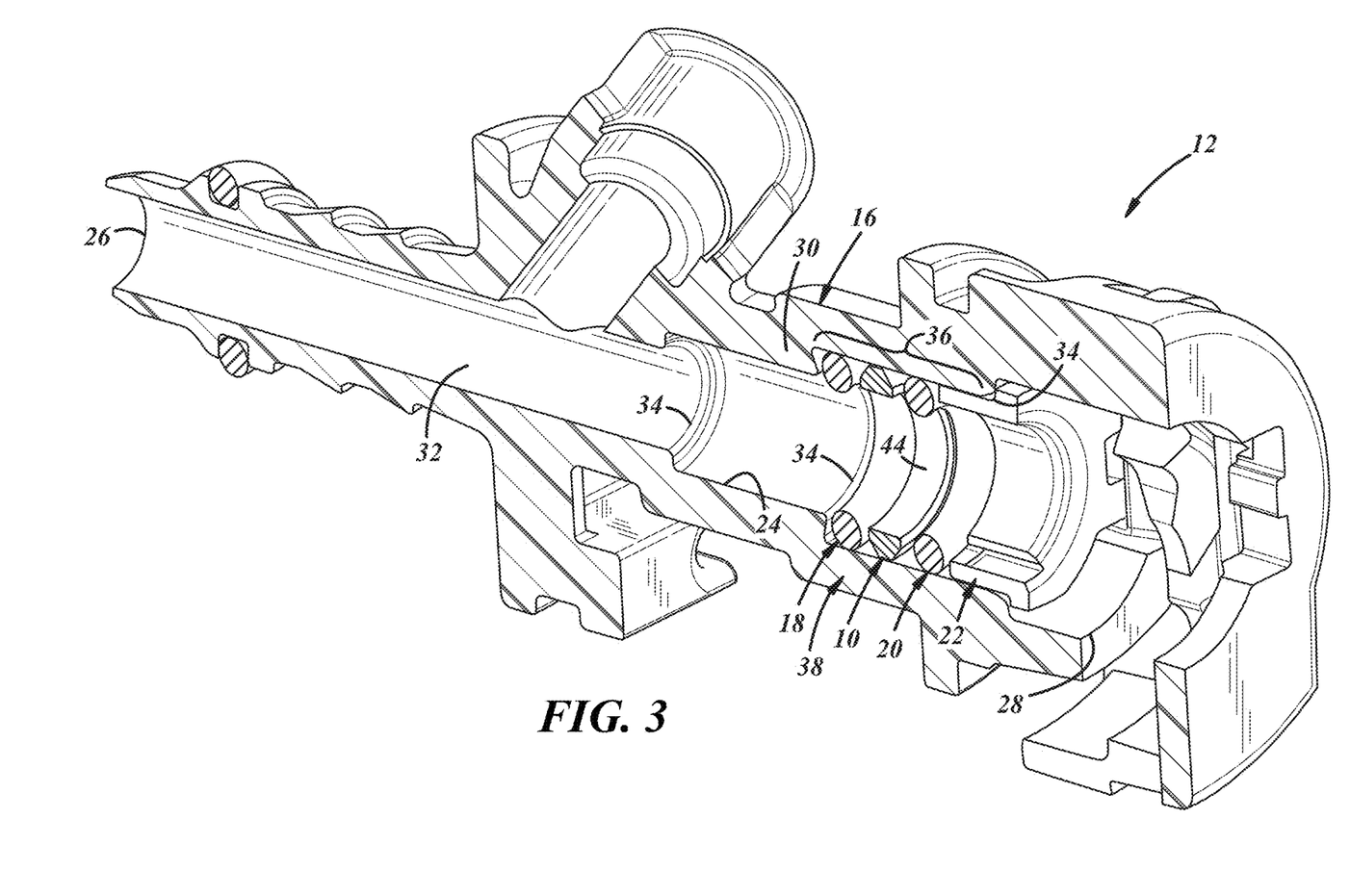
FIG. 3 is a sectional view of an embodiment of a fluid line quick connector, showing some of its components in assembly.

The quick connector 12 has quick-connect functionality for ready connect and disconnect actions with a spigot 14 (FIG. 4). The quick connector 12 can have various designs and constructions in different embodiments depending on, among other potential influences, the larger application in which it is installed, the design and construction of the spigot 14, and the intended attributes of the connection and joints established. For example, the quick connector 12 presented in FIG. 3 has an in-line configuration, but could have an elbow and L-shaped configuration in other embodiments. With reference to FIG. 3, in this embodiment the quick connector 12 includes a main body or housing 16, a first or primary o-ring 18, a second or secondary o-ring 20, a retainer 22, and the spacer 10. Still, other embodiments could include more, less, and/or different components than those set forth here. The housing 16 can be composed of a plastic material. A main passage 24 spans through the housing 16 between a first axial open end 26 and a second axial open end 28. A wall 30 of the housing 16 has an inside surface 32 that defines the main passage 24. The main passage 24 in the embodiment presented has multiple steps 34 along its axial extent which can establish various sections therealong. The spacer 10 and the first and second o-rings 18, 20 reside at an o-ring section 36 of the main passage 24.

Still referring to FIG. 3, the first o-ring 18 establishes a seal at its surface-to-surface interface with the spigot 14 upon insertion and against the inside surface 32. The first o-ring 18 is seated and located within the main passage 24 at the o-ring section 36. At one axial side, the first o-ring 18 directly confronts and can abut one of the steps 34. At its opposite axial side, the first o-ring 18 directly confronts the spacer 10. The first o-ring 18 is also called the bottom o-ring due to its location relative to the direction of insertion of the spigot 14 which, in this embodiment, occurs via the second axial open end 28 (the direction of insertion is represented in FIG. 4 by arrow A). In a similar way, the second o-ring 20 establishes a seal at its surface-to-surface interface with the spigot 14 upon insertion and against the inside surface 32. The second o-ring 20 is seated and located within the main passage 24 at the o-ring section 36. At one axial side, the second o-ring 20 directly confronts the retainer 22, and at its opposite axial side, the second o-ring 20 directly confronts the spacer 10. The first and second o-rings 18, 20 are positioned on each side of the spacer 10 and axially sandwich the spacer 10. The spacer 10 is located beside the first and second o-rings 18, 20 in assembly. The first and second o-rings 18, 20, together with the spacer 10, compose a seal pack assembly 38 that serves to facilitate insertion of, and fit with, the spigot 14 and that serves to establish seals against fluid leakage between the quick connector 12 and the spigot 14. Furthermore, the retainer 22 aids in mechanically securing the spigot 14 in place upon full insertion of the spigot 14 within the quick connector 12. In this regard, the spigot 14 can have a radially-projecting flange around its outer periphery that interacts with the retainer 22.

In past seal packs, previously-known spacer parts have been found to cause mispositioning and dislodging of a neighboring o-ring when a spigot is in the midst of being inserted into the associated quick connector. When this happens, proper insertion of the spigot in the quick connector is thwarted, and the quick connector can consequently be scrapped as ineffective in a production or assembly facility. Without intending to be confined to a particular causation phenomenon, it has been determined that the issue is partly due to the shape of the spacer part in cross-sectional profile and a force component exerted on the o-ring by the spacer part. FIGS. 1 and 2 are provided to demonstrate the problem. A spacer part 200 has a square cross-section. The spacer part 200 is sandwiched on its axial sides by a pair of seals 202, 204, and a clearance 206 resides among the spacer part 200 and seals 202, 204 (the clearance 206 has a somewhat exaggerated depiction in FIG. 1 for demonstrative purposes). The clearance 206 provides a degree of movement of the spacer part 200 with respect to the seals 202, 204. The spacer part 200 is hence able to slide along a housing's inside surface 208 of the associated quick connector, and can revolve slightly about its axis B. As the spigot 14 is inserted into the quick connector, it impinges upon the spacer part 200 and prompts the sliding and revolving movement of the spacer part 200. The spacer part 200, in turn, impinges the seal 202 located downstream of the spigot insertion direction A and located downstream of the spacer part 200. FIG. 1 demonstrates this movement and impingement. With particular reference to FIG. 2, a lower corner portion 210 of the spacer part 200 impinges the seal 202 approximate a contact point 212, producing a force component 214 of a resultant force 216. The force component 214 works to push the seal 202 in a direction C and away from the inside surface 208. As a consequence, the seal 202 is mispositioned and dislodged interiorly of the housing's main passage 218. The broken line cross-section of the seal 202 in FIG. 1 is a rough representation of the mispositioning and dislodgement.

The spacer 10 has been designed and constructed to resolve these shortcomings. The first o-ring 18 is maintained in its intended position at the time of inserting the spigot 14 into the quick connector 12, precluding the unwanted mispositioning and dislodgement issues. The precise design and construction of the spacer 10 may vary in different embodiments depending on, among other possible factors, the larger application in which it is employed. In general, the spacer 10 has a one-piece annular body and is typically composed of a nylon material. In the embodiment of FIGS. 3, 4, 6, and 7, the spacer 10 has a total of six distinct outer surfaces that constitute the whole exterior periphery of the spacer 10. Among the six outer surfaces, the spacer 10 has a total of six end edges transitioning between and adjoining contiguous outer surfaces. The many outer surfaces and end edges establish an overall shape of the spacer 10 that is unlike previously-known spacer parts. With particular reference to the cross-sectional profile of FIG. 7, in this embodiment the spacer 10 has rectangular base portion 40 at a radially-inboard region of the spacer 10, and has a trapezoidal working portion 42 at a radially-outboard region of the spacer 10. The trapezoidal working portion 42 constitutes the portion of the spacer's body that physically interacts and engages the inside surface 32 and the first o-ring 18. For demonstrative purposes, the following directional arrows are presented in FIG. 7: a radially-inboard direction D, a radially-outboard direction E, a first axially-outboard direction F, and a second axially-outboard direction G.

Figure 6:
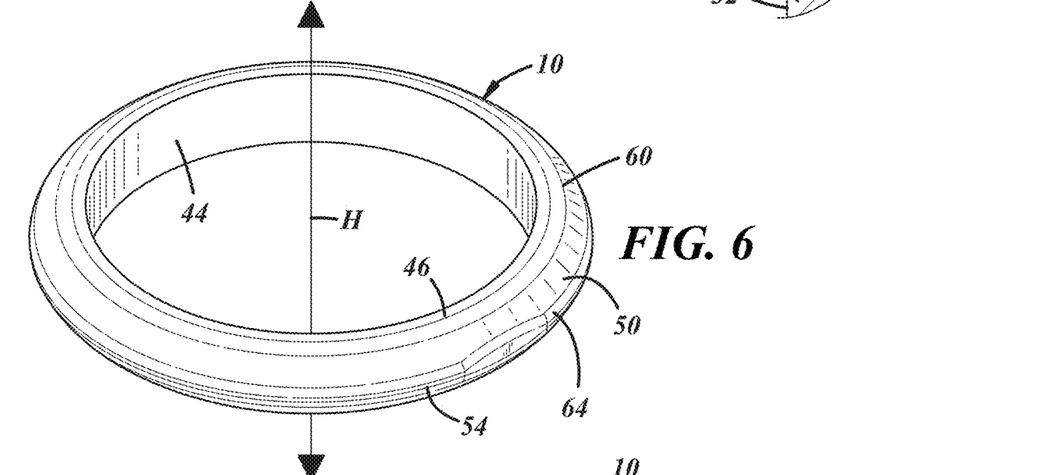
FIG. 6 is a perspective view of an embodiment of a spacer that can be used with the fluid line quick connector of FIG. 3.
Figure 7:
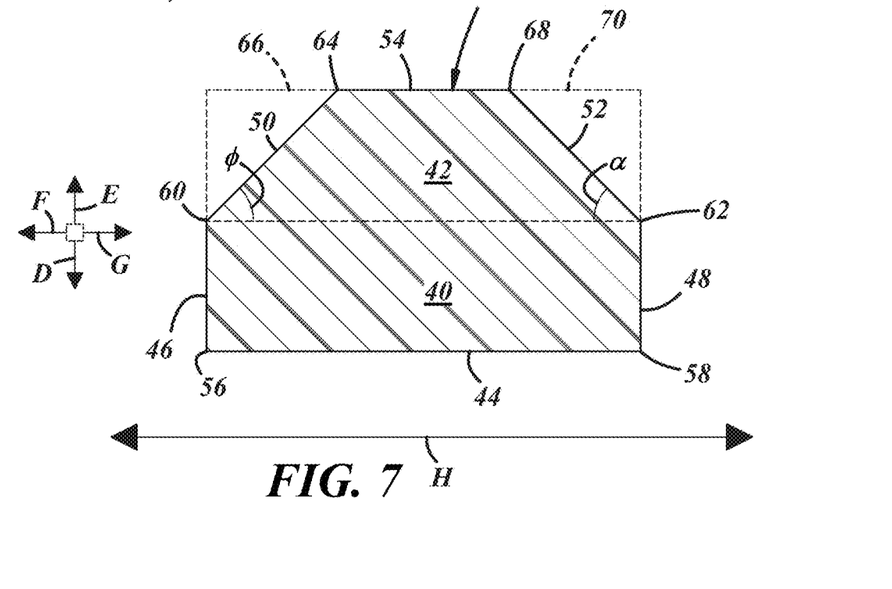
FIG. 7 is a sectional view of an embodiment of a spacer that can be used with the fluid line quick connector of FIG. 3.

In this embodiment, the outer surfaces of the spacer 10 include a radially-inboard surface 44, a first axially-outboard surface 46, a second axially-outboard surface 48, a first angled surface 50, a second angled surface 52, and a radially-outboard surface 54. These surfaces are illustrated in cross-sectional profile in FIG. 7. The radially-inboard surface 44 is generally planar across its full extent and is arranged generally parallel to an axial centerline H of the spacer 10. The radially-inboard surface 44 extends in the axial direction. A first end edge 56 constitutes a first terminal end of the radially-inboard surface 44, and a second end edge 58 constitutes a second terminal end of the radially-inboard surface 44. The radially-inboard surface 44 constitutes the most radially-inboard surface of the spacer 10 in the radially-inboard direction D. The first axially-outboard surface 46, on the other hand, spans from the radially-inboard surface 44, and depends therefrom orthogonally with an established right angle between the two surfaces. The first end edge 56 is situated between and adjoins the radially-inboard surface 44 and the first axially-outboard surface 46. The first axially-outboard surface 46 is generally planar across its full extent and is arranged generally orthogonal to the axial centerline H. The first axially-outboard surface 46 extends in the radial direction. The first end edge 56 constitutes a first terminal end of the first axially-outboard surface 46, and a third end edge 60 constitutes a second terminal end of the first axially-outboard surface 46. As shown in FIG. 6, the third end edge 60 can have a somewhat rounded extent, or can be sharper as shown in FIG. 7. The first axially-outboard surface 46 constitutes the most axially-outboard surface of the spacer 10 in the first axially-outboard direction F.

The second axially-outboard surface 48 has similarities with the first axially-outboard surface 46. It spans from the radially-inboard surface 44, and depends therefrom orthogonally with an established right angle between the two surfaces. The first and second axially-outboard surfaces 46, 48 are parallel with each other and are equidistant with in overall extent. The second end edge 58 is situated between and adjoins the radially-inboard surface 44 and the second axially-outboard surface 48. The second axially-outboard surface 48 is generally planar across its full extent and is arranged generally orthogonal to the axial centerline H. The second axially-outboard surface 48 extends in the radial direction. The second end edge 58 constitutes a first terminal end of the second axially-outboard surface 48, and a fourth end edge 62 constitutes a second terminal end of the second axially-outboard surface 48. Similar to the third end edge 60, in the embodiment shown in FIG. 6 the fourth end edge 62 can have a somewhat rounded extent, or can be sharper as shown in FIG. 7. The second axially-outboard surface 48 constitutes the most axially-outboard surface of the spacer 10 in the second axially-outboard direction G.

The first angled surface 50 spans from the first axially-outboard surface 46. The first angled surface 50 depends from the first axially-outboard surface 46 at an acute angle φ with respect to the axial centerline H. The acute angle φ has a value that is non-zero and is non-right (i.e., not ninety degrees (90°)) relative to the axial centerline H. The precise value of the acute angle φ can vary in different embodiments. In certain embodiments, the acute angle φ can measure approximately forty-five degrees (45°), can measure approximately sixty degrees (60°), or can be a value ranging between approximately 45° and 60°. The third end edge 60 is situated between and adjoins the first axially-outboard surface 46 and the first angled surface 50. The first angled surface 50 can be generally and mostly planar across its full extent as shown in FIGS. 6 and 7. The first angled surface 50 extends angularly relative to both of the axial and radial directions. The third end edge 60 constitutes a first terminal end of the first angled surface 50, and a fifth end edge 64 constitutes a second terminal end of the first angled surface 50. The fifth end edge 64 is situated and located axially inward in the second axially-outboard direction G with respect to the first axially-outboard surface 46 and to the third end edge 60. In the embodiment of FIG. 6, the fifth end edge 64 can have a somewhat rounded extent, or can be sharper as shown in FIG. 7.

With continued reference to FIG. 7, relative to previously-known spacer parts, the first angled surface 50 establishes a clearing 66 at the spacer's outer region that would otherwise be occupied by spacer structure in the previously-known spacer part 200. But in the embodiment of the spacer 10, the clearing 66 remains unoccupied and is free of spacer structure. And it is the removal and absence of the structure at the clearing's location, it is thought, that alters the behavior of the spacer 10 amid insertion of the spigot 14 in a desired manner that maintains proper positioning of the first o-ring 18, as described below.

The second angled surface 52 spans from the second axially-outboard surface 48. The second angled surface 52 depends from the second axially-outboard surface 48 at an acute angle α with respect to the axial centerline H. The acute angle α has a value that is non-zero and is non-right (i.e., not ninety degrees (90°)) relative to the axial centerline H. The precise value of the acute angle α can vary in different embodiments. In certain embodiments, the acute angle α can measure approximately forty-five degrees (45°), can measure approximately sixty degrees (60°), or can be a value ranging between approximately 45° and 60°. And in certain embodiments, the acute angle α can be approximately equal to the acute angle φ. The fourth end edge 62 is situated between and adjoins the second axially-outboard surface 48 and the second angled surface 52. The second angled surface 52 can be generally and mostly planar across its full extent as shown in FIGS. 6 and 7. The second angled surface 52 extends angularly relative to both of the axial and radial directions. The fourth end edge 62 constitutes a first terminal end of the second angled surface 52, and a sixth end edge 68 constitutes a second terminal end of the second angled surface 52. The sixth end edge 68 is situated and located axially inward in the first axially-outboard direction F with respect to the second axially-outboard surface 48 and to the fourth end edge 62. In the embodiment of FIG. 6, the sixth end edge 68 can have a somewhat rounded extent, or can be sharper as shown in FIG. 7.

With continued reference to FIG. 7, relative to previously-known spacer parts, the second angled surface 52 establishes a clearing 70 at the spacer's outer region that would otherwise be occupied by spacer structure in the previously-known spacer part 200. But in the embodiment of the spacer 10, the clearing 70 remains unoccupied and is free of spacer structure. And it is the removal and absence of the structure at the clearing's location, it is thought, that alters the behavior of the spacer 10 amid insertion of the spigot 14 in a desired manner that maintains proper positioning of the first o-ring 18, as described below.

The radially-outboard surface 54 spans between the first and second angled surfaces 50, 52. The radially-outboard surface 54 lies parallel to the radially-inboard surface 44. The fifth end edge 64 is situated between and adjoins the radially-outboard surface 54 and the first angled surface 50. Likewise, the sixth end edge 68 is situated between and adjoins the radially-outboard surface 54 and the second angled surface 52. The radially-outboard surface 54 can be generally planar across its full extent as shown in the embodiment of FIG. 7, or can have a slight and soft arc across part or more of its full extent as shown in FIG. 6. The radially-outboard surface 54 is arranged generally parallel to the axial centerline H. The radially-outboard surface 54 extends in the axial direction. The fifth end edge 64 constitutes a first terminal end of the radially-outboard surface 54, and the sixth end edge 68 constitutes a second terminal end of the radially-outboard surface 54. Lastly, the radially-outboard surface 54 constitutes the most radially-outboard surface of the spacer 10 in the radially-outboard direction E.

Figure 5:
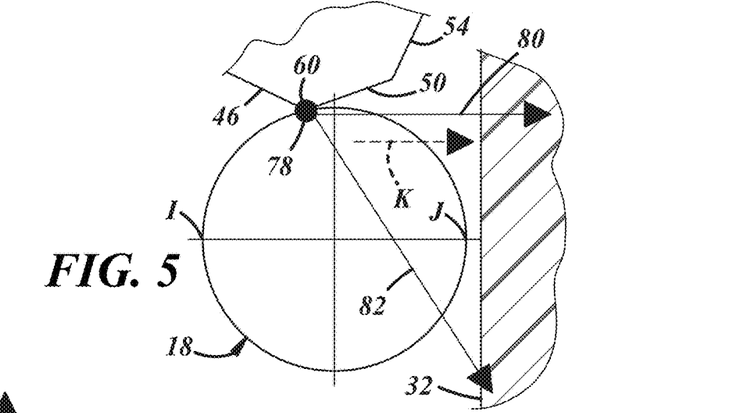
FIG. 5 depicts one of the o-rings of FIG. 4, and shows a representation of a contact point and force component thereof.

When employed in use in the seal pack assembly 38, the spacer 10 helps maintain the intended and proper position of the first o-ring 18 at the time of inserting the spigot 14 into the quick connector 12. FIGS. 4 and 5 are provided to demonstrate its use. A slight clearance 72 resides among the spacer 10 and the first and second o-rings 18, 20, enabling a degree of movement of the spacer 10 relative to the o-rings 18, 20. As the spigot 14 is inserted into the quick connector 12, the spigot 14 impinges upon the spacer 10 and prompts slight sliding of the spacer 10 along the inside surface 32 and prompts slight revolving of the spacer 10 about its axis. The spacer 10, in turn, impinges the first o-ring 18. FIG. 4 illustrates the components of the seal pack assembly 38 after insertion of the spigot 14. The fifth end edge 64 can make edge-to-surface abutment with the inside surface 32 over a section of the fifth end edge's extent. A first contact point 74 is hence established therebetween. In a similar manner, the sixth end edge 68 can make edge-to-surface abutment with the inside surface 32 over a section of the sixth end edge's extent. A second contact point 76 is hence established therebetween. At the interface and interaction of the spacer 10 and first o-ring 18, and with particular reference to FIG. 5, the spacer 10 can make direct and immediate impingement with the first o-ring 18. The third end edge 60 can make edge-to-surface abutment with the first o-ring 18. A third contact point 78 is hence established therebetween. Compared to the contact point 212 of the past spacer part 200, the third contact point 78 is located at a position that is more radially-inboard on the first o-ring 18 itself (radially is used here relative to the annular shape of the first o-ring). Put another way, the spacer 10 abuts the first o-ring 18 at a point nearer to an inner circumference I of the first o-ring 18 than to an outer circumference J thereof. The third contract point 78 is relocated relative to that of the past spacer part 200. At least partly due to this relocation, it is thought, a force component 80 of a resultant force 82 exerted on the first o-ring 18 has changed direction. The force component 80 resulting from the use of the spacer 10 is now in a general direction K. The direction K is outwardly of the main passage 24 and is toward the inside surface 32. Therefore, the spacer 10 and the force component 80 work to urge and push the first o-ring 18 toward and against the inside surface 32.

Furthermore, testing was conducted in order to evaluate the performance and effectiveness of the spacer 10 with respect to its impact on the positioning of the first o-ring 18. The test procedure was performed on a quick connector having a seal pack assembly similar to the seal pack assembly 38 of FIG. 3, and with a spacer having the angled surfaces described above. The relevant acute angles at the angled surfaces was approximately 45° and 60°. The associated quick connector had a three-eighths inch (⅜") diameter of its main passage, and an in-line configuration. The test procedure was meant to replicate an assembly and installation of the quick connector with a spigot that takes place at a production and assembly facility, which is performed by hand by an assembler. Here, axes of a quick connector and a spigot can be misaligned—in other words, the quick connector and spigot can be brought together at an off-axis angle relative to each other, with the spigot being unaligned with a central axis of the connector's main passage. The spigot was fixed in place on a test bench, and the quick connector was brought to the spigot for insertion by hand. The axes of the quick connector and spigot were misaligned by 30° and 10° with respect to each other. The misalignment was set in four directions: rightward (east, E), leftward (west, W), upward (north, N), and downward (south, S). After each insertion, the quick connector was removed from the spigot, and the location of the o-ring was observed visually by the tester. If observed out-of-place and obstructing the connector's main passage, such condition constituted a failure. The quick connector, on the other hand, successfully passed testing if the o-ring remained in its intended position during the test procedure.

Figure 8:
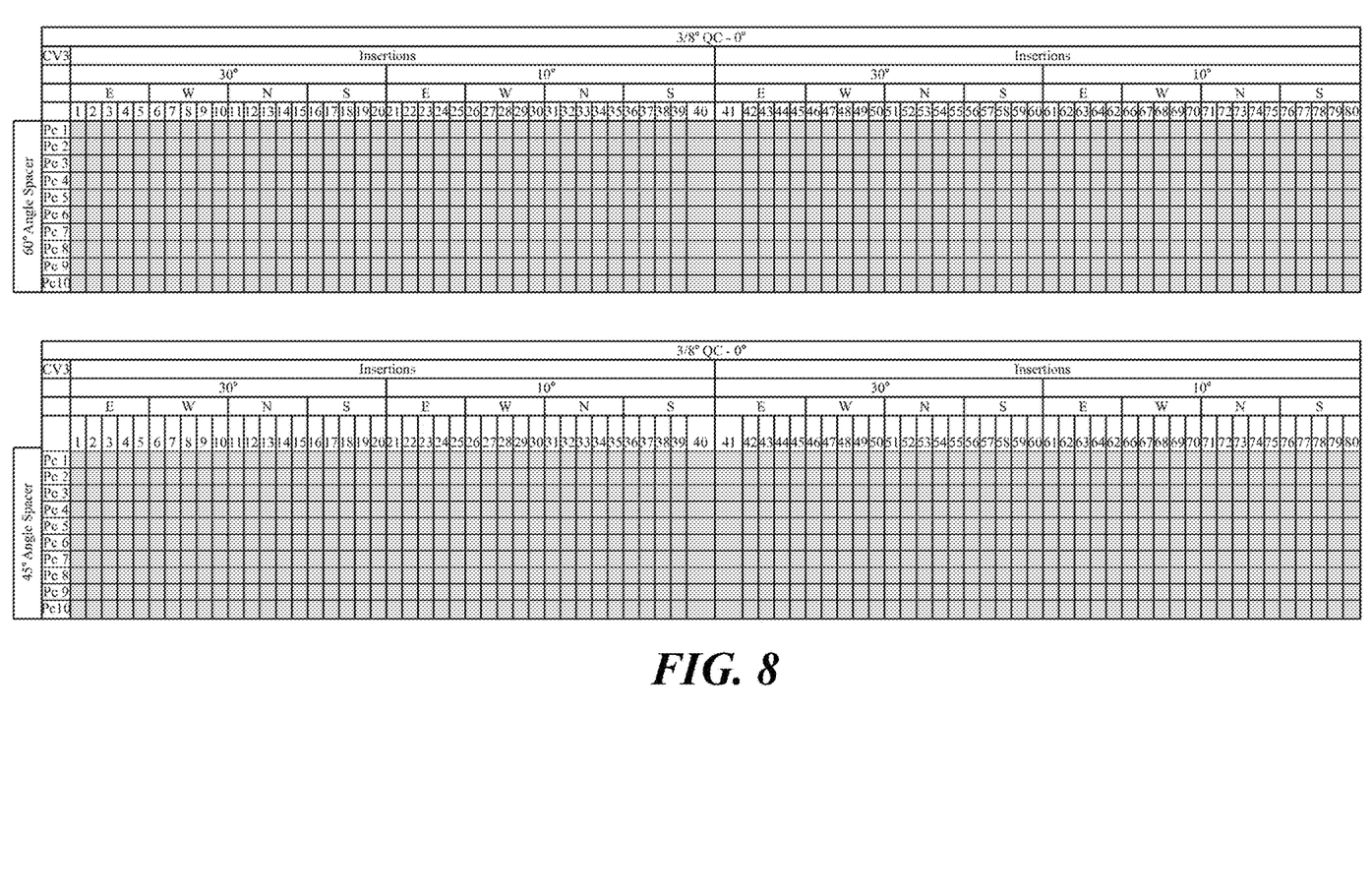
FIG. 8 presents a table of test results for testing conducted on a spacer similar to that shown in FIG. 7.

FIG. 8 presents a pair of tables of test results for such test procedures. The shaded boxes indicate that the quick connectors successfully passed testing. The upper table in FIG. 8 involved quick connectors with spacers having angled surfaces and acute angles of 60° ("60° Angle Spacer"). There was a total of ten quick connector specimens subjected to the test procedure ("Pc1, Pc2, Pc3 . . . Pc10"). The tested quick connector was inserted with the fixed spigot at misalignment angles of 30° and 10°, and at the four misalignment directions ("E, W, N, S"). Each insertion was performed five times in the particular misalignment direction ("E: 1, 2, 3, 4, 5 . . . W: 6, 7, 8, 9, 10"). Similarly, the lower table in FIG. 8 involved quick connectors with spacers having angled surfaces and acute angles of 45° ("45° Angle Spacer"). All tested quick connectors and spacers successfully passed these test procedures.

Still, the spacer 10 could have other designs and constructions that lack specific depiction in the figures. As but a couple of examples, the spacer 10 could have a single angled surface and/or the radially-inboard surface 44 could itself include multiple surfaces.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An automotive fluid line quick connector, comprising:
a housing having a passage and a wall, said wall having an inside surface defining said passage, said passage having a longitudinal axis;
a first o-ring located within said passage at a first longitudinal position with respect to said longitudinal axis;
a second o-ring located within said passage at a second longitudinal position with respect to said longitudinal axis; and
a spacer located within said passage longitudinally between said first and second o-rings and between said first and second longitudinal positions, said spacer having a first angled surface making a first acute angle with respect to an axial centerline of said spacer, a second angled surface making a second acute angle with respect to the axial centerline of said spacer, a radially-outboard surface spanning between said first and second angled surfaces, a first end edge adjoining said first angled surface and said radially-outboard surface, and a second end edge adjoining said second angled surface and said radially-outboard surface, said first and second acute angles being non-zero and non-right angles with respect to the axial centerline of said spacer, said spacer further having a first axially-outboard surface spanning from said first angled surface and a second axially-outboard surface spanning from said second angled surface;

wherein, upon insertion of a spigot within the automotive fluid line quick connector and into said passage, said first end edge makes contact with said inside surface and said second end edge makes contact with said inside surface and said spacer urges said first o-ring toward said inside surface;

wherein, after insertion of the spigot within the automotive fluid line quick connector and into said passage, said spacer is positioned askew with respect to said longitudinal axis, and said first angled surface and said first axially-outboard surface confront said first o-ring in a longitudinal direction, and said second angled surface and said second axially-outboard surface confront said second o-ring in the longitudinal direction.

2. The automotive fluid line quick connector as set forth in claim 1, wherein, upon insertion of the spigot within the automotive fluid line quick connector and into said passage at a relationship with the spigot unaligned with a central axis of said passage, said spacer urges said first o-ring toward said inside surface.

3. The automotive fluid line quick connector as set forth in claim 1, wherein said spacer has a third end edge adjoining said first angled surface and said first axially-outboard surface, and a fourth end edge adjoining said second angled surface and said second axially-outboard surface, and wherein, upon insertion of the spigot within the automotive fluid line quick connector and into said passage, said third end edge or said fourth end edge makes abutment with said first o-ring and urges said first o-ring toward said inside surface.

4. The automotive fluid line quick connector as set forth in claim 1, wherein said first acute angle and said second acute angle have values that are equal to each other.

5. The automotive fluid line quick connector as set forth in claim 1, wherein said first acute angle and said second acute angle each have values that range between forty-five degrees (45°) and sixty degrees (60°) with respect to the axial centerline of said spacer.

6. The automotive fluid line quick connector as set forth in claim 1, wherein, in sectional profile, said spacer has a total of six distinct surfaces that include said first and second angled surfaces, said radially-outboard surface, and said first and second axially-outboard surfaces.

7. The automotive fluid line quick connector as set forth in claim 6, wherein the total of six distinct surfaces further includes a radially-inboard surface.

8. The automotive fluid line quick connector as set forth in claim 1, wherein, in sectional profile, said spacer has a trapezoidal working portion at an outer region of said spacer, said trapezoidal working portion being established in part by said first and second angled surfaces and by said radially-outboard surface.

\* \* \* \* \*